(12) United States Patent
Jones et al.

(10) Patent No.: US 10,679,105 B2
(45) Date of Patent: Jun. 9, 2020

(54) LINE SEGMENT CODE FOR EMBEDDING INFORMATION IN AN IMAGE

(71) Applicant: Idemia Identity & Security USA LLC, Billerica, MA (US)

(72) Inventors: Robert L. Jones, Andover, MA (US); Robert Andrew Eckel, Andover, MA (US)

(73) Assignee: Idemia Identity & Security USA LLC, Billerica, MA (US)

( * ) Notice: Subject to any disclaimer, the term of this patent is extended or adjusted under 35 U.S.C. 154(b) by 0 days.

(21) Appl. No.: 16/236,068

(22) Filed: Dec. 28, 2018

(65) Prior Publication Data

US 2019/0205713 A1    Jul. 4, 2019

Related U.S. Application Data

(60) Provisional application No. 62/611,504, filed on Dec. 28, 2017.

(51) Int. Cl.
| G06K 19/06 | (2006.01) |
| G06K 19/10 | (2006.01) |
| G06K 1/12  | (2006.01) |

(52) U.S. Cl.
CPC ....... G06K 19/06046 (2013.01); G06K 1/121 (2013.01); G06K 19/10 (2013.01)

(58) Field of Classification Search
CPC ..... G06K 19/0646; G06K 19/10; G06K 1/112
See application file for complete search history.

(56) References Cited

U.S. PATENT DOCUMENTS

| 3,897,964 | A  | * | 8/1975  | Oka ........................ | G06K 19/083 283/111 |
| 4,765,656 | A  | * | 8/1988  | Becker ..................... | G07D 7/00 283/70 |
| 7,494,057 | B2 | * | 2/2009  | Lasch ...................... | G06K 19/02 235/380 |
| 8,301,893 | B2 | * | 10/2012 | Brundage ................. | G06T 1/0071 713/176 |
| 2002/0167692 | A1 | * | 11/2002 | Cunningham ........... | B29C 39/10 359/2 |
| 2003/0183695 | A1 | * | 10/2003 | Labrec ..................... | G06K 19/08 235/487 |
| 2005/0001419 | A1 | * | 1/2005  | Levy ........................ | B41M 5/24 281/2 |
| 2006/0129489 | A1 | * | 6/2006  | Hersch .................... | B42D 25/342 705/50 |

(Continued)

OTHER PUBLICATIONS

PCT International Search Report in International Application No. PCT/US2018/068024, dated Mar. 14, 2019, 10 pages.

*Primary Examiner* — Daniel I Walsh
(74) *Attorney, Agent, or Firm* — Fish & Richardson P.C.

(57) ABSTRACT

Methods, systems, and apparatus, including computer programs encoded on a computer storage medium, for identifying, by a computer system, at least one line of a plurality of lines that are disposed at a first layer of a card; providing, by the computer system and based on the identified at least one line, control signals to a laser device of the computer system, the control signals indicating coordinates for the identified at least one line; generating, by the laser device and based on the control signals, one or more line patterns that are embedded at a particular layer of the card.

20 Claims, 5 Drawing Sheets

(56) References Cited

U.S. PATENT DOCUMENTS

| | | | |
|---|---|---|---|
| 2007/0259431 A1* | 11/2007 | Charlton | B01L 3/5027 436/2 |
| 2008/0128493 A1* | 6/2008 | Jones | B41M 5/24 235/380 |
| 2011/0057040 A1* | 3/2011 | Jones | B41M 3/144 235/487 |
| 2012/0037707 A1* | 2/2012 | Curiel | G06K 19/10 235/488 |
| 2012/0182374 A1* | 7/2012 | Matsuda | G06F 3/1208 347/225 |
| 2012/0192738 A1* | 8/2012 | Sanger | B41F 5/24 101/401 |
| 2015/0151550 A1* | 6/2015 | Asai | B41J 3/01 347/225 |
| 2017/0144470 A1* | 5/2017 | Freudenberger | B42D 25/23 |
| 2018/0018846 A1* | 1/2018 | Falko | G06K 7/1417 |
| 2019/0202229 A1* | 7/2019 | Jones | B42D 25/435 |
| 2019/0205713 A1* | 7/2019 | Jones | G06K 19/10 |

\* cited by examiner

LINE SEGMENT CODE FOR EMBEDDING INFORMATION IN AN IMAGE

FIELD

This specification relates to line code for embedding information in an image.

BACKGROUND

User identifications such as driver licenses can be issued either as physical identification cards or digital identifications. A physical identification (ID) card is issued by creating a card that includes customer information, whereas a digital identification is issued in an electronic format and accessed on a client device. Both physical and digital identifications are commonly used for verifying the identity of an individual, providing access to restricted areas, or authorizing an individual to purchase age-restricted content.

SUMMARY

Line patterns can include line segments that are used to encode data on an identification document. The document can be a physical identification card that includes multiple background lines. The background lines can be preprinted (or variable printed images) for engraving data based on LASINK laser printing technology. The preprinted background lines can have multiple iterations of groups of colored lines that are based a particular color model, such as an RGB or CMY color model. For example, cyan, magenta, yellow (CMY) lines can be preprinted on a background of a physical ID card and a key (black) can be used to create line patterns by masking certain colored CMY lines. Laser engraving, or other related laser printing technology, can be used to create line segments of line patterns that encode various types of data related to the card holder. In some implementations, various other color combinations and laser printing technologies may be used to generate the preprinted background lines as well as to engrave or embed the line patterns for encoding personal information about a holder of the identification document.

One aspect of the subject matter described in this specification can be embodied in a computer-implemented method. The method includes identifying, by a computer system, at least one line of multiple lines that are disposed at a first layer of a card; providing, by the computer system and based on the identified at least one line, control signals to a laser device of the computer system, the control signals indicating coordinates for the identified at least one line; and generating, by the laser device and based on the control signals, one or more line patterns that are embedded at a particular layer of the card, wherein the lines patterns include line code segments that encode identifying information about an individual.

These and other implementations can each optionally include one or more of the following features. For example, in some implementations, generating the one or more line patterns includes: selecting one or more lines of the multiple lines disposed at the first layer of the card; and embedding, at the selected one or more lines, sensitive information that represents encoded credential data for authenticating the card. In some implementations, the selected one or more lines includes a preprinted color line and generating the one or more line patterns includes generating line code segments of a line pattern at a selected preprinted color line by applying a black line or a white line over the color of the selected preprinted color line.

In some implementations, the laser is a yttrium aluminum garnet ("YAG") laser and the method further includes: generating a line segment photo at the card using a lasink based set of lines derived from the multiple lines disposed at the first layer of the card. In some implementations, the line segment photo is a color image that is generated by applying pixels of black at a second layer of the card that is directly adjacent the first layer of the card; and the pixels of black are applied over a preprinted color line disposed at the first layer of the card. In some implementations, the method further includes embedding, at the line segment photo, encoded credential data for authenticating the card, wherein the encoded credential data is embedded at the line segment photo using line patterns generated by the laser device.

In some implementations, the coordinate information for identifying the at least one line is provided with reference to an X,Y plane of the card. In some implementations, the multiple lines are distinct sets of preprinted color lines including colors that are based on a particular color model; and the distinct sets of preprinted color lines are disposed at a background layer of the card. In some implementations, the method further includes, using one or more commands of the computer system to calibrate the laser device to a respective X,Y coordinate of a preprinted colored line in the distinct sets of preprinted color lines. In some implementations, the method further includes, in response to calibrating the laser device to the respective X,Y coordinate of the preprinted colored line, identifying, by the computer system, a particular preprinted colored line to generate a line pattern of the one or more line patterns embedded at the card.

Other implementations of this and other aspects include corresponding systems, apparatus, and computer programs, configured to perform the actions of the methods, encoded on computer storage devices, e.g., non-transitory machine-readable storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented to realize one or more of the following advantages. The described techniques can be used to generate line patterns on a physical identification card to securely embed personal or other identifying information about a card holder. The information is securely embedded in the card by using sets of preprinted color lines that can be included at a various layers of the card and a particular type of laser technology. The laser technology is applied to the preprinted background lines to engrave line segments of line code patterns into the physical structure of the card. The engraved line code patterns and line segments provide a highly secure method of encoding particular types of data. The encoded data can be securely detected or decoded to authenticate the identification document, verify the identity of the card holder, or both.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes techniques for embedding data in an image or document (e.g., an identification document). The described techniques can be used to embed variable personal information in an image of a document, such as an identification card or driver's license. In some implementations, an image associated with a document or ID card can be a Lasink portrait. For example, a Lasink laser personalizing process for embedding identification credentials can include using a series of cyan, yellow, and magenta ("CYM") lines and white spacer lines to generate an image or portrait for an identification (ID) document/card.

The CYM color lines can be preprinted on a physical card that serves as a basis for creating an example identification document such as a driver's license card or related credential card or document. In some cases, the card may use a white background in its core as the white lines. The preprinted color lines can be duplicated and spaced evenly in an [X,Y] plane of the card and/or spaced apart at intervals equaling the width (e.g., in pixels) of each color. The line spacing and interval layout creates the white line. Line segment code technology can be used in conjunction with the Lasink laser personalizing process to embed information in an ID document. For example, a laser can be used to create line segments at one or more layers of the ID document. In some implementations, the laser creates the line segments based on an engraving subtractive process for creating colored images from the preprinted color lines.

Figure 1:
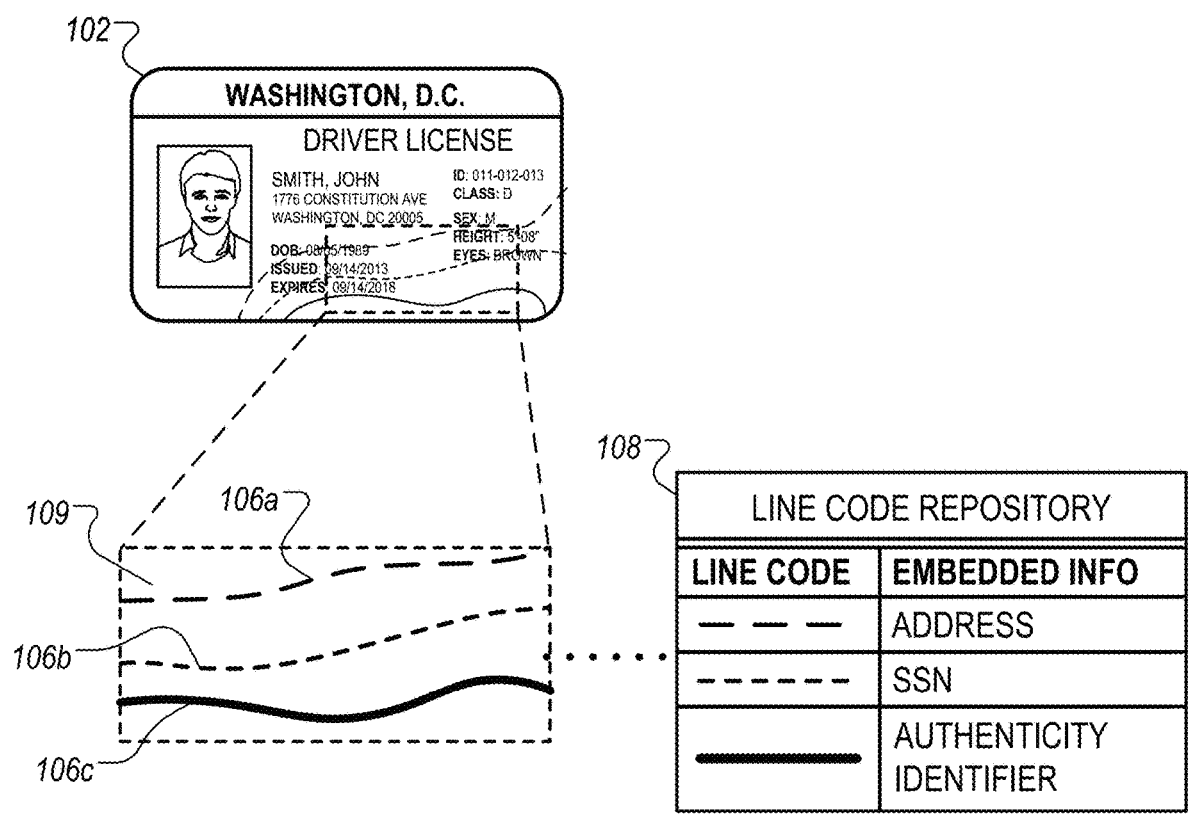
FIG. 1 illustrates an example of a physical identification document with embedded line segment data.

FIG. 1 illustrates an example of a physical identification document (e.g., an ID card) with line patterns embedded at a certain region/area of the document. In the example, identification/ID card 102 includes a customer photograph and embedded line patterns 106a, 106b, and 106c. Identification 102 is constructed such that different regions or areas of the identification article are outlined with different patterns. For example, line pattern 106a outlines a line pattern having a first spacing characteristic, line pattern 106b outlines a line pattern having a second spacing characteristic that differs from the first (i.e., smaller length), and line pattern 106c includes a solid line portion that can be used to indicate an authenticity identifier.

In some implementations, lines associated with a particular pre-print pattern can have certain line portions removed. The removed line portions therefore create an area/space 109 in which line segments associated with line code can be embedded. In some implementations, the line code can be configured in a curved manner that can be used to create outlines of particular patterns such as buildings, state capitals, state birds, or any other background pattern or image outline corresponding to a particular authority indicator/identifier for a given jurisdiction. In some implementations, the line patterns are used as part of the image data associated with an ID card. The line patterns can be used to securely embed encoded data that relate to identifying features of an individual.

Although the figure illustrates line patterns 106a-c being embedded within a physical identification, in other instances, the line patterns 106a-c can also be embedded within a digital identification (e.g., a digitally issued driver license). In addition, although the example depicted illustrates visibly detectable line patterns (e.g., visible to a human eye), in other instances, the line patterns can be constructed small enough to appear invisible to the human eye. In such instances, the line patterns can outline microfeatures of a customer photograph (or other portions of the identification 102).

Each of the line patterns 106a, 106b, and 106c are distinctive from one another based on their line attributes. Examples of line attributes include the spacing of line segments within a pattern line, the length of the pattern line, the color of the pattern line, among others. As described above, the line pattern is also associated with a portion of secure customer information. The secure customer information can be identified within a line pattern repository 108 that includes mappings between each line pattern and corresponding secure customer information. As depicted, the line pattern 106a is mapped to customer address, the line pattern 106b is mapped to a social security number, and the line pattern 106c is mapped to an authenticity identifier.

The detection of the line patterns 106a-c and associated secure customer information can be used to verify the authenticity of the identification 102. As an example, verification data for the identification 102 can specify the line patterns 106a-c, the arrangement of the line patterns 106a-c within identification 102, and/or the associated credential information included within the line pattern repository 108. In this example, a detector device (described below) may compare detection data obtained from an identification presented by a customer to the verification data for the identification 102. For instance, if the detector device fails to detect each of the line patterns 106a-c, or detects an incorrect arrangement of the line patterns 106a-c, then the detector device may determine that the presented identification is a fraudulent ID card.

In another example, secure customer information obtained from the detected line patterns of a presented identification can be used to authenticate a customer in addition to the credential information specified by the identification (e.g., name, date of birth, address, etc.). In this example, line patterns can be included and/or embedded within the identification to securely authenticate a customer without exposing sensitive or personally identifiable information (e.g., social security number). In this regard, line pattern detection can be used to securely verify sensitive customer information.

Figure 2:
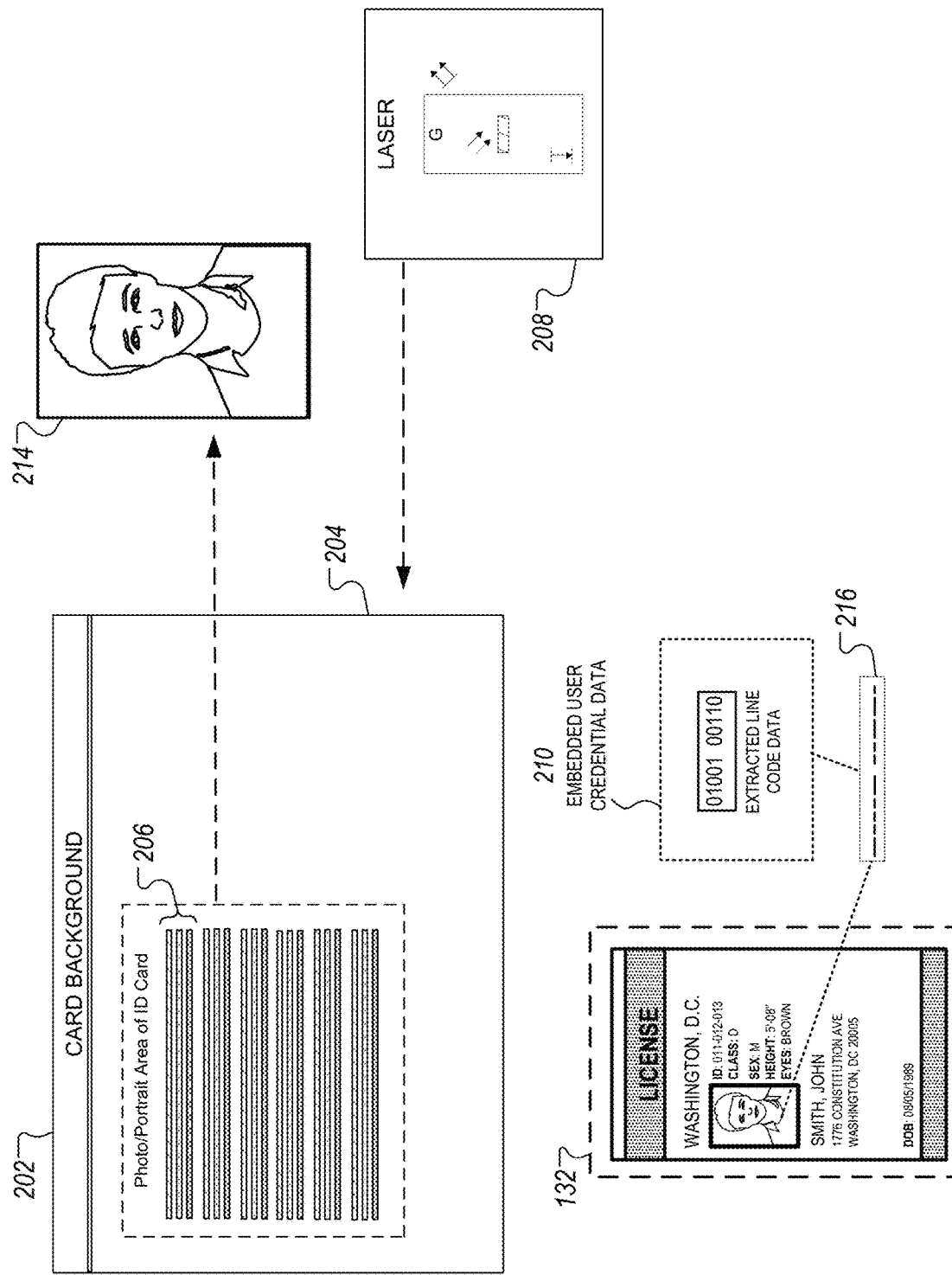
FIG. 2 illustrates an example card with preprinted lines for creating line segment code for embedding data using a laser.

FIG. 2 illustrates an example card 202 with preprinted lines for creating line segment code for embedding data using a laser. Card 202 can be used to create an identification card that includes embedded line segments used to encode credential data for an individual. The credential data can be personally identifiable information about an individual, such as a person's social security number, address, date of birth, or driver's license number. As described in more detail below, the line patterns and line segments of the patterns can be created using an example Lasink process. Line patterns that are created using the Lasink process are embedded in an identification document or card (e.g., at a preprinted background of the card) and are used to encode personal information based on line pattern technology.

In general, the Lasink laser process can be used to create a color image. For example, a Lasink laser can be a YAG laser that is configured to write lines (e.g., in black and white) on a physical substrate, such as a background layer of an identification card 202. In some implementations, a Lasink YAG laser is used to implement a data personalization process based on laser engraving technology. The laser engraving technology can be associated with a subtractive laser process for embedding line patterns in a layer of an identification card when the laser interacts with preprinted colored lines that are included at a background layer of a card.

For example, card 202 can have a preprinted background layer 204 that includes multiple sets of lines 206. Lines 206 can be colored lines, such as the CYM lines described above. Card 202 can be an identification or credential card that includes a white background in the core of the card. Lines 206 can be preprinted onto background layer 204 such that the white background layer can be used as white lines. In some implementations, lines 206 are duplicated and spaced evenly in an [X,Y] plane of card 202. In some instances, card 202 includes multiple distinct sets of lines 206 and each set of lines 206 may be spaced apart at intervals equaling the width (e.g., in pixels) of each color (C, Y, or M) included in the lines 206. The line spacing and interval layout of lines 206 can be used to create the white lines.

In general, line segment code technology can be used in conjunction with a Lasink laser personalizing process to embed information in an ID document. For example, a laser 208 can be used to create line segments at a layer (e.g., background layer 204) of ID card 202 based on a laser engraving process. In some implementations, the laser engraving process is a subtractive laser process for creating colored images and portraits. For example, laser 208 can be an yttrium aluminum garnet ("YAG") laser that implements a color laser image print process. In some implementations, the color laser image print process is based on a propriety Lasink process that can be used to generate a color photo on card 202, e.g., by laser engraving. In some implementations, card 202 is an example polycarbonate card or any other type of card material that is suitable for laser engraving.

Laser 208 is used to execute a Lasink laser engraving process to embed line patterns onto card 202. For example, a computer system is operable to provide control signals to laser 208 to cause the laser to interact with card 202 to generate line patterns at card 202 using one or more sets of lines 206. In some implementations, lines 202 can be identified at card 202 based on certain XY coordinates of each lines. The computer system can use programed instructions to register or calibrate the laser 208 to the X,Y coordinates of each preprinted colored line of the different sets of lines 206. Based on this coordinate registration, the computer system and laser 208 can be used to locate, identify, or select a particular colored line of lines 206. As noted above, card 202 can include one or more of a cyan (C) line, a yellow (Y) line, and a magenta (M) line (e.g., the CYM lines). Card 202 can also include one or more white (W) lines that are interspersed between each line of the colored lines 206 or between distinct sets of colored lines 206.

Using subtractive color technology, laser 208 can be focused on at least one of the identified colored lines (e.g., on the yellow line of lines 206). The computer system can cause laser 208 to create or place a pixel at a predefined writing definition (e.g., 800 dpi/ppi) at the yellow line to create a particular color or color scheme. For example, to create a black color or scheme, laser 208 can be used to select a white line and the laser can then write over the selected white line such that the remaining three colors (cyan, yellow, and magenta) combine to show the color black.

To embed sensitive information or credential data, the computer system can be programed to select at least one of the lines 206 (e.g., W, C, Y, M). The system can then use the laser 208 to create line patterns at the selected colored line by applying black or white lines over the color of the selected line. In some implementations, lines that are not used to embed line patterns for encoding data can be detailed into the quality of the color photo or portrait included in ID card 202. Portrait 214 represents an example color portrait that depicts an image constructed from laser 208 being applied to the preprinted layers of card 202.

For example, using the described techniques, a computing system can scan card 202 to identify and select a group of preprinted CYM lines 206. Laser 208 can then write black lines above lines in the selected group of lines 206 to embed data into the lines, where areas of high density are used to "hide" or conceal the data or line patterns. Hence, line patterns generated by laser 208 to encode data can be embedded at card 202 such that areas of high density color obscure the line patterns that encode the sensitive data. Alternatively, a computing system can use laser 208 to create a line segment photo and embed line patterns/data into the line segment photo using a Lasink base set of lines to create a "black" photo or portrait. In some implementations, the described techniques can be used to write line pattern data that can be decoded or interpreted to generate a facial template. Line patterns that are created using laser 208 to embed different types of data can also function as replacements for digital or physical watermarks.

In some implementations, card 202 includes YAG sensitized material at a layer of the card structure above, near, or adjacent a layer, e.g., background layer 204, of card 202 that contains the color ingredients. The color ingredients can correspond to example preprinted colored lines 206. Hence, at the layer above or adjacent (e.g., directly adjacent) the layer that includes color lines 206 there is a sensitizer that is used to create black (or white) representations in pixel or line form. In some implementations, the CYM lines 206 that are preprinted at the layer below or adjacent the upper YAG/laser sensitized layer, can be printed at high resolution, e.g., 8,000 dpi/ppi or 10,000 dpi/ppi). Lines 206 can be contiguous lines that are positioned at card 202 in a left to right horizontal format. In some instances, the lines 206 is placed only go in a layer of card 202 to correspond with the placement of the color portrait.

In general, line patterns embedded within an example physical or digital identification article (e.g., card or displayed image on a device) can be formed using a series of lines that create the appearance of a wave going across the face of the identification article. For physical cards, ink jet printers, ultra-violet (UV) laser printers, YAG laser printers, or any other suitable print device can be used to produce the embedded line patterns described in this specification. In some implementations, printer devices can be configured such that an offset print pattern can include spacing between lines used to generate readable larger print information typically viewable on an identification article (e.g., card owner name, address, data of birth (DOB), etc.). The spacing between the lines used to generate readable print can be sufficient such that embedded line patterns that encode certain formation can be sized small enough to fit between the line spaces created by the offset print pattern.

In some examples, with regard to physical identification cards, an identification card designer can utilize a YAG laser to embed one or more lines between, for example, the colored or non-colored lines associated with the standard text/print of an identification card. This example card can already include a photograph of the card owner as well as the card owner's demographic information. Embedded line pattern data would then be included on top of, for example, a pre-printed background information associated with the identification article. When embedded within the standard text/print information of the identification card, the line segments of the encoded line pattern data can be interspersed with the standard text/print line data to create the appearance of a wave pattern. Some identification cards can be printed using dies that have certain see-through attributes. Thus, in some implementations, the embedded line pattern data may be viewable on the background of an example physical identification card.

As shown, identification 132 can include an example line pattern 216 embedded in identification 132 (e.g., from Lasink process applied to ID card 202). As shown in FIG. 2, line pattern 216 can correspond to encoded data that is scanned and used to generate an example binary data sequence that includes "01001 00110" (or more bits, e.g., 1-bit to 1,000 bits). In some instances, encoded line data can be decoded, in part, by scanning or capturing an image of an example identification article (e.g., identification 132) with a computing device such as a smartphone, a digital camera, or a laptop computing device. The example binary data sequence can be processed using a detector device 140 to authenticate the identification or to verify the identity of the card holder. Thus, line patterns embedded within an identification article can be scanned to extract and process encoded data to provide enhanced identification verification.

Figure 3:
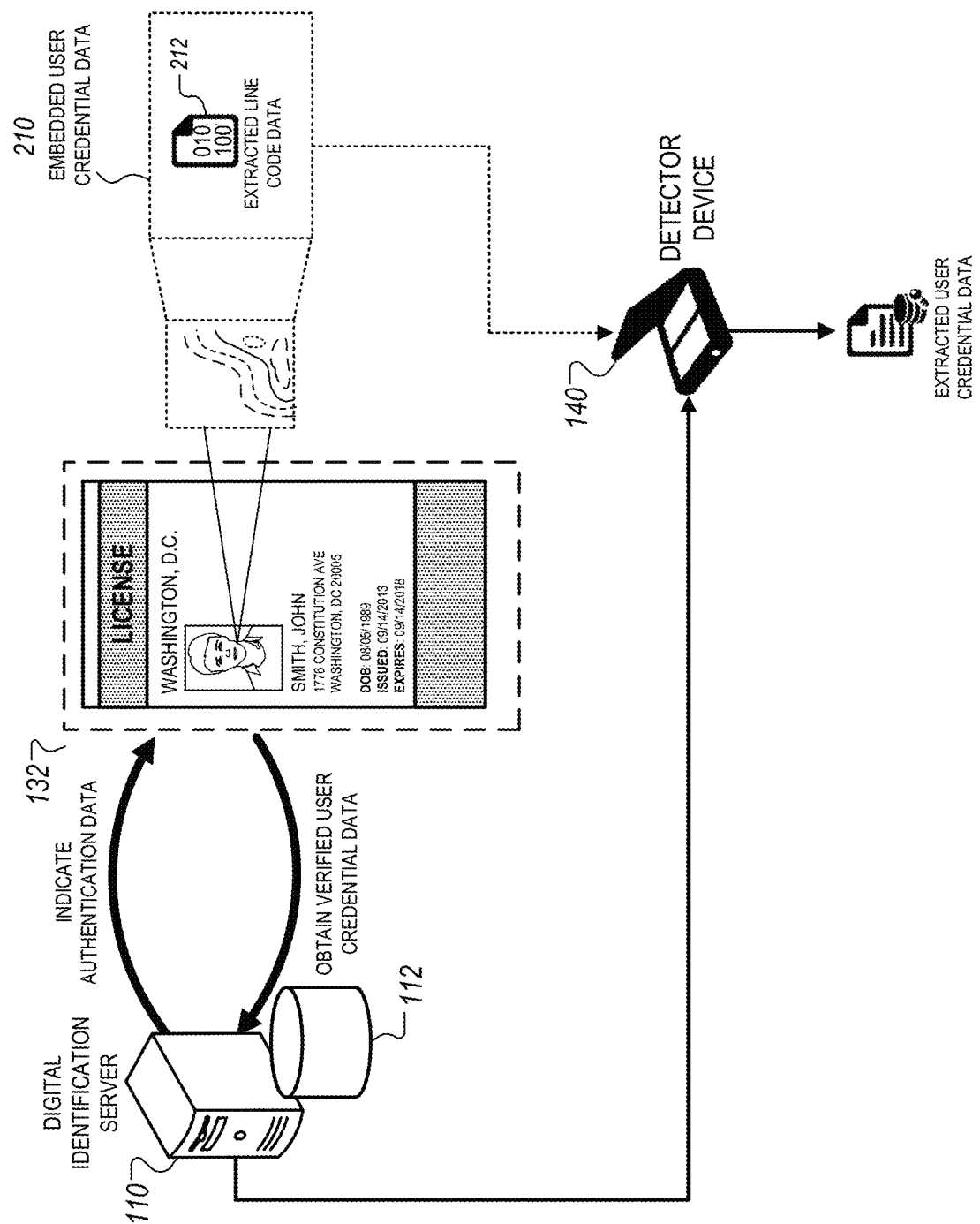
FIG. 3 illustrates an example of a system for verifying an identification document based on data extracted from embedded line patterns of the identification document.

FIG. 3 illustrates an example of a system 300 for verifying an identification document based on data extracted from embedded line patterns of the identification 132. Identification server 110 initially obtains secure customer information using different techniques. In some instances, the secure customer information may be obtained during the enrollment process when the customer is requested to verify his identity by providing personally identifiable information (e.g., social security number, user authentication information, etc.). The obtained customer information can then be stored and associated with designated line patterns.

Line pattern repository 108 maps specific line patterns that are embedded within the identification 132 to pieces of secure information obtained by the identification server 110. The line pattern repository 108 thus enables the identification of a corresponding piece of secure customer information based upon the detection of an embedded line pattern within the identification 132. The line pattern repository 108 may be stored in the digital identification database 112, and subsequently transmitted to authorized devices that perform verification of the identification 132 such as a detector device 140.

During a verification operation of identification 132, the detector device 140 initially scans or interprets line pattern data 212 within the identification 132. This can be accomplished using various types of optical recognition techniques. For instance, the detector device 140 can be configured to recognize designated line patterns that are included within the line pattern repository 108. During a scan of the identification 132, the detector device 140 may identify the presence of the designated line patterns, and extract the identified line patterns as the extracted line pattern data 212. The line pattern data 212 may specify a coordinate location (e.g., in an XY plane) within the digital identification where a particular line pattern was detected.

The detector device 140 can then obtain secure credential data assigned to the extracted or interpreted line pattern data 210 using the information specified within the line pattern repository 108. For instance, the detector device 140 may cross-reference each of the detected line patterns indicated by the extracted line pattern data 210 with the line patterns that are specified within the line pattern repository 108 in order to determine the pieces of personal or credential information assigned to each line pattern. The detector device 140 can verify the claimed identity based on the extracted credential information 212 to verify the authenticity of the identification 132 as well as the identity of the cardholder.

Figure 4:
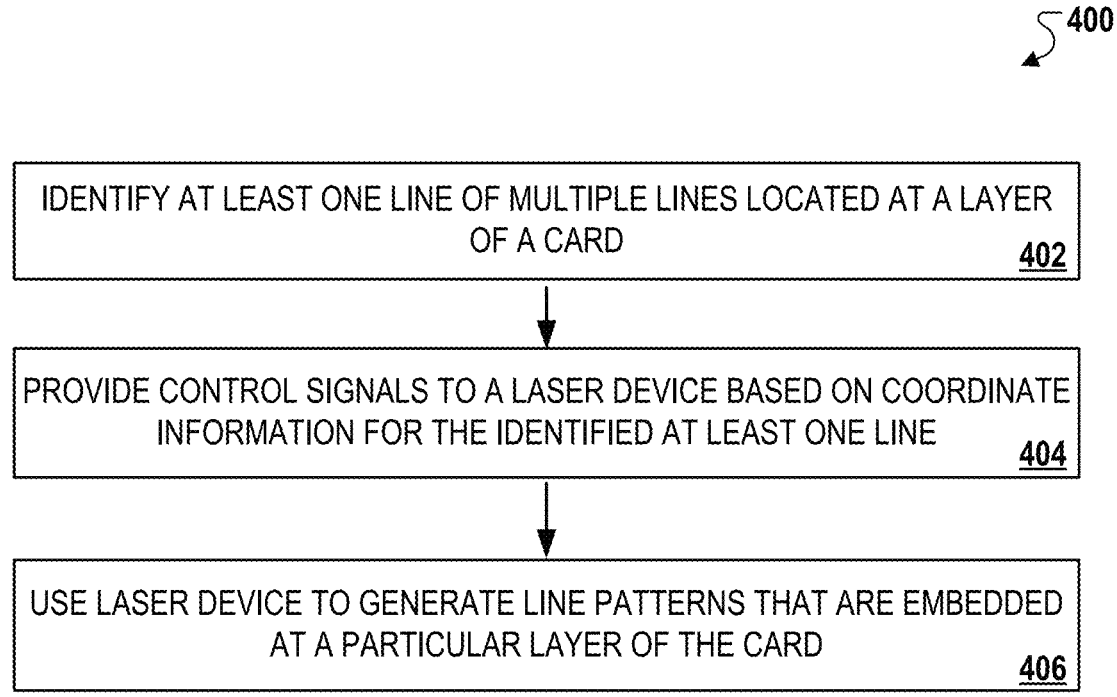
FIG. 4 shows a flow diagram of an example process for embedding line segment data in an identification document.

FIG. 4 shows a flow diagram of an example process 400 for embedding line segment data in an identification document. Process 400 can be implemented or executed using the systems and devices described above. In some implementations, the described actions of process 400 are enabled by computing logic or programmed instructions executable by processing devices and memory of computing resources described in this document. At block 402 of process 400, a computer system identifies at least one line of multiple lines that are disposed at a first layer of a card. At block 404, the computer system provides control signals to a laser device of the system, based on the identified at least one line. The control signals indicate coordinates for the identified at least one line. The coordinate information for identifying the at least one line is provided with reference to an XY plane of the card. In some implementations, each line of the multiple lines are preprinted at a background layer of the card. At block 406, based on the control signals, the laser device generates one or more line patterns that are embedded at a particular layer of the card.

The described techniques for encoding data includes using the line segment code technology to embed data into the Lasink color laser system. The Lasink system utilizes colored preprinted lines to create a 'subtraction' based color scheme. Hence, one can utilize the same system to embed data based on line segment code technology that includes using line segments instead of pixels to encode the data. The described techniques are not restricted to photos but can be used to create background images and designs that combine the Lasink background system of lines with the process of data embedding based on the line segment code technology. For example, the describe systems are operable to embed a series of Lasink lines in a pattern or design in an X,Y plane and then embed data into the lines thereby causing shifts to the visual pattern purposefully to generate unique patterns or images for each user credential.

Figure 5:
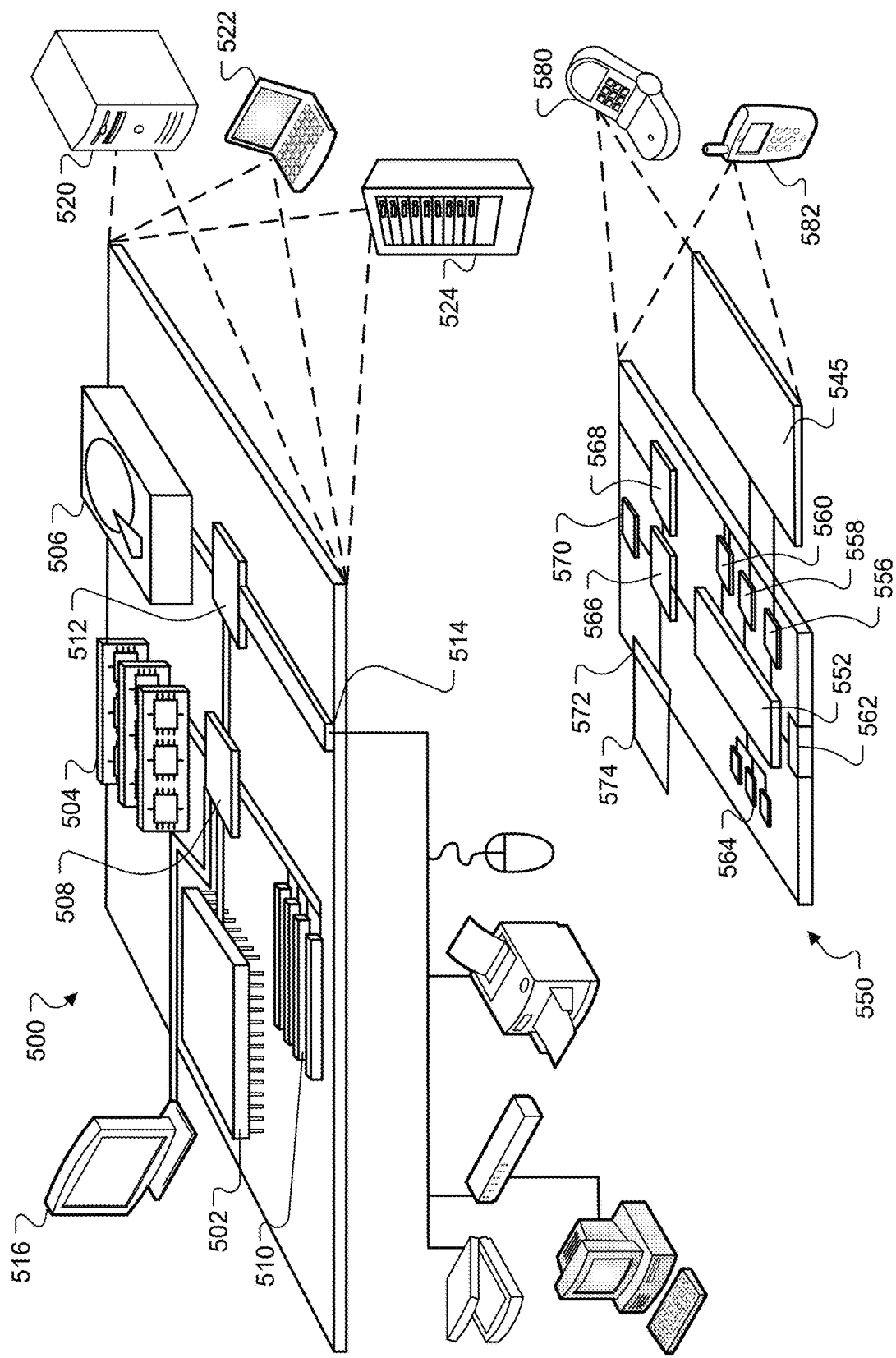
FIG. 5 shows a block diagram of a computing system that can be used in connection with computer-implemented methods described in this specification.

FIG. 5 is a block diagram of computing devices 500, 550 that may be used to implement the systems and methods described in this document, as either a client or as a server or multiple servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations, e.g., as a server bank, a group of blade servers, or a multi-processor system.

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516, e.g., through a graphics processor or accelerator, and to high-speed expansion ports 510, which may accept various expansion cards (not shown). In the implementation, low-speed controller 512 is coupled to storage device 506 and low-speed expansion port 514. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication, e.g., via a docking procedure, or for wireless communication, e.g., via Bluetooth or other such technologies.

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound, e.g., voice messages, music files, etc., and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, certain data may be treated in one or more ways before it is stored or used, so that personally identifiable information is removed. For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the spirit and scope of the invention. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A computer-implemented method, comprising:
identifying, by a computer system, at least one line of a plurality of preprinted color lines that are disposed at a first layer of a card;
providing, by the computer system and based on the identified at least one line, control signals to a device of the computer system that is operable to engrave a plurality of distinct line segments on the surface of the first layer using two or more distinct preprinted color lines disposed at the surface of the first layer, the control signals indicating coordinates for each of the two or more distinct preprinted color lines; and
generating, by the device and based on the control signals, a line pattern using (i) each distinct line segment in the plurality of distinct line segments that is engraved on the surface of the first layer of the card and (ii) a particular color of a second, different layer of the card that is exposed when at least one distinct line segment is engraved on the surface of the first layer of the card, wherein the line pattern encodes identifying information about an individual.

2. The method of claim 1, wherein generating the line pattern comprises:
selecting one or more lines of a plurality of lines disposed at the first layer of the card; and
embedding, at the selected one or more lines, sensitive information that represents encoded credential data for authenticating the card.

3. The method of claim 2, wherein the selected one or more lines comprises a preprinted color line and generating the one or more line patterns comprises:
generating line code segments of a line pattern at a selected preprinted color line by applying a black line or a white line over the color of the selected preprinted color line.

4. The method of claim 1, wherein the device of the computer system is a yttrium aluminum garnet ("YAG") laser and the method comprises:
generating a line segment photo at the card using a set of lines derived from a plurality of lines disposed at the first layer of the card.

5. The method of claim 4, wherein:
the line segment photo is a color image that is generated by applying pixels of black at a layer of the card that is directly adjacent the first layer of the card; and
the pixels of black are applied over a preprinted color line disposed at the first layer of the card.

6. The method of claim 5, comprising:
embedding, at the line segment photo, encoded credential data for authenticating the card, wherein the encoded credential data is embedded at the line segment photo using line patterns generated by the laser device.

7. The method of claim 1, wherein identifying comprises:
identifying the at least one line based on coordinate information that is provided with reference to an X,Y plane of the card.

8. The method of claim 7, wherein:
the plurality of preprinted color lines are distinct sets of preprinted color lines comprising colors that are based on a particular color model; and
the distinct sets of preprinted color lines are disposed at a background layer of the card.

9. The method of claim 8, comprising:
using one or more commands of the computer system to calibrate a laser of the device to a respective X,Y coordinate of a preprinted colored line in the distinct sets of preprinted color lines.

10. The method of claim 9, comprising:
in response to calibrating the laser of the device to the respective X,Y coordinate of the preprinted colored line, identifying, by the computer system, a particular preprinted colored line to generate a particular line pattern of one or more line patterns to be embedded at the card.

11. A system, comprising:
one or more processing devices; and
one or more non-transitory machine-readable storage devices storing instructions that are executable by the one or more processing devices to cause performance of operations comprising:
identifying, by a computer system, at least one line of a plurality of preprinted color lines that are disposed at a first layer of a card;
providing, by the computer system and based on the identified at least one line, control signals to a device of the computer system that is operable to engrave a plurality of distinct line segments on the surface of the first layer using two or more distinct preprinted color lines disposed at the surface of the first layer, the control signals indicating coordinates for each of the two or more distinct preprinted color lines; and
generating, by the device and based on the control signals, a line pattern using (i) each distinct line segment in the plurality of distinct line segments that is engraved on the surface of the first layer of the card and (ii) a particular color of a second, different layer of the card that is exposed when at least one distinct line segment is engraved on the surface of the first layer of the card, wherein the line pattern encodes identifying information about an individual.

12. The system of claim 11, wherein generating the line pattern comprises:
selecting one or more lines of a plurality of lines disposed at the first layer of the card; and
embedding, at the selected one or more lines, sensitive information that represents encoded credential data for authenticating the card.

13. The system of claim 12, wherein the selected one or more lines comprises a preprinted color line and generating the one or more line patterns comprises:
generating line code segments of a line pattern at a selected preprinted color line by applying a black line or a white line over the color of the selected preprinted color line.

14. The system of claim 11, wherein the device of the computer system is a yttrium aluminum garnet ("YAG") laser and the operations comprises:
generating a line segment photo at the card using a set of lines derived from a plurality of lines disposed at the first layer of the card.

15. The system of claim 14, wherein:
- the line segment photo is a color image that is generated by applying pixels of black at a layer of the card that is directly adjacent the first layer of the card; and
- the pixels of black are applied over a preprinted color line disposed at the first layer of the card.

16. The system of claim 15, wherein the operations comprise:
- embedding, at the line segment photo, encoded credential data for authenticating the card, wherein the encoded credential data is embedded at the line segment photo using line patterns generated by the laser device.

17. The system of claim 11, wherein identifying comprises:
- identifying the at least one line based on coordinate information that is provided with reference to an X,Y plane of the card.

18. The system of claim 17, wherein:
- the plurality of preprinted color lines are distinct sets of preprinted color lines comprising colors that are based on a particular color model; and
- the distinct sets of preprinted color lines are disposed at a background layer of the card.

19. The system of claim 18, wherein the operations comprise:
- using one or more commands of the computer system to calibrate a laser of the device to a respective X,Y coordinate of a preprinted colored line in the distinct sets of preprinted color lines; and
- in response to calibrating the laser of the device to the respective X,Y coordinate of the preprinted colored line, identifying, by the computer system, a particular preprinted colored line to generate a particular line pattern of one or more line patterns to be embedded at the card.

20. One or more non-transitory machine-readable storage devices storing instructions that are executable by one or more processing devices to cause performance of operations comprising:
- identifying, by a computer system, at least one line of a plurality of preprinted color lines that are disposed at a first layer of a card;
- providing, by the computer system and based on the identified at least one line, control signals to a device of the computer system that is operable to engrave a plurality of distinct line segments on the surface of the first layer using two or more distinct preprinted color lines disposed at the surface of the first layer, the control signals indicating coordinates for each of the two or more distinct preprinted color lines; and
- generating, by the device and based on the control signals, a line pattern using (i) each distinct line segment in the plurality of distinct line segments that is engraved on the surface of the first layer of the card and (ii) a particular color of a second, different layer of the card that is exposed when at least one distinct line segment is engraved on the surface of the first layer of the card, wherein the line pattern encodes identifying information about an individual.

* * * * *